United States Patent [19]

Barber

[11] Patent Number: 4,540,443

[45] Date of Patent: Sep. 10, 1985

[54] COOLING SYSTEM CLEANING COMPOSITION

[75] Inventor: Alan G. Barber, Woodbury, Conn.

[73] Assignee: Union Carbide Corporation, Danbury, Conn.

[21] Appl. No.: 620,968

[22] Filed: Jun. 15, 1984

[51] Int. Cl.$^3$ .......................... C23G 1/18; C23F 11/12
[52] U.S. Cl. ........................................ 134/2; 134/22.1; 134/22.16; 134/41; 252/80; 252/86; 252/87
[58] Field of Search ................ 252/80, 86, 87; 134/2, 134/22.1, 22.16, 41

[56] References Cited

U.S. PATENT DOCUMENTS

| | | | |
|---|---|---|---|
| 2,153,952 | 4/1939 | Bayes | 252/5 |
| 2,802,788 | 8/1957 | Flaxman | 252/105 |
| 3,079,343 | 2/1963 | Bernard | 252/75 |
| 3,308,065 | 3/1967 | Lesinski | 252/82 |
| 3,419,501 | 12/1968 | Levy | 252/137 |
| 3,492,238 | 1/1970 | Wohlberg | 252/87 |
| 3,959,166 | 5/1976 | Oberhofer et al. | 252/146 |
| 3,962,109 | 6/1976 | Oberhofer et al. | 252/146 |

*Primary Examiner*—Paul Lieberman
*Assistant Examiner*—Robert A. Wax
*Attorney, Agent, or Firm*—James L. Sonntag

[57] ABSTRACT

A cooling system cleaning composition comprising an aqueous solution of a tetra-alkali metal salt of ethylenediaminetetraacetic acid, a soluble salt of citric acid, and a soluble salt of nitric acid. The preferred composition also contains an aluminum corrosion inhibitor and has a pH between about 10 and about 14.

32 Claims, No Drawings

COOLING SYSTEM CLEANING COMPOSITION

FIELD OF THE INVENTION

The present invention relates to cleaner compositions for the removal of scale, and oxidation products, in particular solder bloom, from the metal surfaces of cooling systems, such as radiator cooling systems of internal combustion engines.

BACKGROUND OF THE INVENTION

In systems where an aqueous solution contacts a metallic surface there is always the problem of corrosion of the metal. This is particularly true in heat exchange systems, such as automotive coolant systems. In these systems the aqueous coolant usually contains dissolved calcium ions, may be highly aerated due to a low level of the circulating coolant, and is heated by the heat of combustion of the engine. These are ideal conditions for the formation of rust, scale, and various corrosion products. The problem is aggravated by the use in automotive coolant systems of a variety of metals of fabrication, including cast iron, steel, aluminum, copper, brass, and lead/alloy solders. To a large extent, the corrosion problem can be controlled by the inclusion of various corrosion inhibitors in the coolant or antifreeze composition used in the cooling system. However, particularly when the consumer does not use adequate antifreeze, or renew the antifreeze an regular intervals, scale and corrosion products may accumulate on the metallic surfaces in the cooling system to an extent to seriously impair the cooling efficiency of the cooling system. To clean out these accumulated scale and corrosion products, there have been proposed various cleaners that dissolve the scale and corrosion products. By "scale" is meant any hard, thin coating that adheres to metal surfaces. Scale may be any combination of iron oxides from corrosion, hard water precipitates such as calcium phosphates, or other metal corrosion products.

In order to remove accumulated deposits, cleaner compositions have been proposed containing various acids, reactive salts, and/or chelating agents. For example, Flaxman in U.S. Pat. No. 2,802,733, issued Aug. 13, 1967, discloses a cleaning composition comprising EDTA, sodium tripolyphosphate, sodium acid sulfite, and a mixed mono- and di-oleic acid ester of polyoxethylene glycol. Levy in U.S. Pat. No. 3,419,501 issued Dec. 31, 1968, discloses a cleaning composition comprising an aminopolycarboxylic acid salt, such as tetrasodium EDTA, a nitrate salt, and an alkali metal silicate. Wohlberg in U.S. Pat. No. 3,492,238 discloses a cleaning composition consisting of citric acid, sodium phosphate, sodium hydroxyethylglycine, and sufficient water to maintain the pH between 6 and 7.

Although the prior art compositions, as typified by those described in the above United States Patents, are effective in removing rust and scale, they are not effective in removing solder bloom. Solder bloom is a corrosion product of high lead solders (lead content greater than about 95 wt.%), that remains in situ as it forms. The volume of the solder bloom is much larger than the original solder. As a result, the accumulation of solder bloom around the soldered joints and entrances to the cooling tubes causes a significant decrease in the cross-sectional area and a corresponding decrease in cooling efficiency of the cooling system. Formerly automobile cooling systems were fabricated with solders having a lower lead content, typically about 80 weight percent. With these solders the accumulation of solder bloom is either negligible or non-existent. Starting about 1965, certain automobile manufacturers began using solder with a higher lead content (greater than about 95 wt. % lead). Therefore, as the number of older cars with high-lead solder in their cooling systems has progressively increased, the problem of solder bloom accumulation exists today in millions of cars. Thus, there is an increasing need in the industry for a metal cleaner composition that not only removes scale, and rust, but also removes solder bloom. The applicant is unaware of prior-art cleaner compositions that satisfy this need of removing solder bloom.

An object of this invention is to provide a composition that is effective in the removal of solder bloom from metal cooling systems.

It is also an object of the invention to provide a composition that removes solder bloom, as well as rust, scale and other corrosion products from metal cooling systems.

SUMMARY OF THE INVENTION

In its broadest aspect the invention includes a cooling system cleaning composition comprising an aqueous solution of a tetra-alkali-metal salt of ethylenediaminetetraacetic acid (EDTA), a soluble salt of citric acid, and a soluble salt of nitric acid. Preferably the pH of the composition is between about 10 and about 14, more preferably between about 11.5 and 12.5. Preferably the composition additionally contains an aluminum corrosion inhibitor, which is preferably sodium silicate, in a corrosion inhibitory amount. It is also preferred that the EDTA acid salt, the nitric acid salt, and the citric acid salt be the sodium salts.

The salts in the composition of the invention are in amounts effective for removing solder bloom, preferably also scale. The composition is suitable for removal of solder bloom, if the concentration of each of the EDTA, citrate, and nitrate salts is above the effective amount. Amounts greater than the effective amount will increase the rate of cleaning and/or provide cleaning ability with respect to other corrosion products, such as scale. For solder bloom removal, the effective amounts are greater than about 0.3 weight percent of the tetrasodium salt of ethylenediaminetetraacetic acid, greater than about 0.6 weight percent trisodium citrate dihydrate, and greater than about 0.2 weight percent sodium nitrate. The greater part of the remaining portion of the composition of the invention is preferably water, with smaller amounts of other additives discussed below. To also provide a composition for the removal of scale, the composition of the invention should contain at least about 2 weight percent trisodium citrate dihydrate. The upper limits of concentration of the EDTA, citrate and nitrate constituents are limited by the solubilities of the salts. Preferably the concentrations are not near saturation so as to prevent precipitation of salts during storage or in the cooling system. These upper concentration limits in an aqueous solution at a pH between about 10 and about 14 are about 15 weight percent of the tetrasodium salt of ethylenediaminetetraacetic acid, about 35 weight percent of trisodium citrate dihydrate, and about 20 weight percent of sodium nitrate. Although the above description is in terms of the sodium salts, it is understood that other suitable salts that are soluble in an aqueous solution to provide equivalent anion concentrations could be used.

In the preferred practice of the invention, the EDTA, citrate, and nitrate salts are dissolved in water to form a concentrated solution. The concentrated solution is then added to a flushed out cooling system and diluted with water at a dilution ratio between 0:1 and about 10:1, preferably between about 5:1 and about 10:1, volumes water to volumes concentrate, the diluted concentrate providing a cleaning composition of the invention.

Another aspect of the invention is a method for cleaning solder bloom from cooling systems which comprises (a) removing any antifreeze coolant from the cooling system; (b) adding to the cooling system a concentrate comprising an aqueous solution of a tetra-alkali-metal salt of ethylenediaminetetraacetic acid, of a soluble salt of citric acid, and of a soluble salt of nitric acid; (c) adding water to the cooling system at a dilution ratio of between 0:1 to 10:1 volumes water to volumes concentrate to provide a diluted concentrate; (d) circulating the diluted concentrate through the cooling system; and (e) removing the diluted concentrate from the cooling system.

Although the composition and method of the invention are described and claimed in terms of the sodium salts it is understood that any suitable salt soluble in aqueous solutions to a sufficient amount is contemplated. Unless otherwise designated, values in weight percent are based on the total weight.

It has been discovered that by combining the three constituents of the invention, the EDTA, citrate, and nitrate salts, a cleaning composition can be made that removes solder bloom. Preferably, as discussed above, the composition of the invention has additional citrate salt in an amount to provide a composition that removes scale. Thus, the invention in this preferred form provides a "universal" cleaner, that is, a cleaner which will clean all of the various corrosion products from a cooling system. As explained above, prior art compositions are not effective in removal of solder bloom.

As is illustrated in the examples below, compositions lacking any one of the three essential constituents of the invention, the EDTA, citrate and nitrate salts, are not effective in the removal of solder bloom, and in some instances are not effective in removing even other corrosion products. The interaction of the three constituents is not fully understood, but there is a coaction or a synergism of the constituents, providing an effective solder bloom cleaner.

DESCRIPTION OF THE INVENTION

The concentrations of the tetra-alkali-metal EDTA, the soluble citrate salt, and the nitrate salt in the cooling system must be present in a sufficient amount to at least remove solder bloom. To be commercially acceptable, the composition should remove at least about 85 percent of the solder bloom. The percent of solder bloom removal is determined by visually observing the quantity of solder bloom corrosion material on metal surfaces and the percentage of clogging in the entrances of the tubes before cleaning, and after cleaning estimating the amount of solder bloom removed. Above 85% the tube entrances are essentially free of solder bloom, with small amounts of solder bloom remaining on other solder surfaces. By practice of the invention, a removal of 90 to 100 percent is possible, which corresponds to very little solder bloom remaining on the lead/tin solder surfaces in the cooling system.

Preferably, the composition of the invention also contains at least one aluminum corrosion inhibitor in a corrosion inhibitory amount. By "corrosion inhibitory amount" is meant an amount that provides measurable corrosion inhibition with respect to aluminum as compared to the same composition without inhibitors. A suitable inhibitor is an alkali metal silicate, such as sodium silicate. Typical concentrations of the sodium silicate inhibitor (as 40 wt.% solution of a mixture of 3.22 parts $SiO_2$ to 1.0 part $Na_2O$) are, between about 0.01 weight percent and about 0.6 weight percent.

In the preferred practice of the invention, the pH of the composition is between about 10 and about 14, more preferably between about 11.5 and about 12.5. These pH ranges are necessary for the optimum function of the preferred sodium silicate aluminum corrosion inhibitor. Below a pH of about 8.5, the sodium silicate inhibitor is ineffective. Compositions outside of the above pH ranges are also contemplated within the invention, although they are less desirable. Between a pH of about 7 and about 10, the combined solubilities of the EDTA, citrate, and nitrate salts are lower. Therefore, various salts may precipitate from the composition, particularly when the constituents are in a high concentration. At acid pH values, the composition of the invention is also effective, but there is an undesirable increase of corrosion of the various metals of the coolant system.

The composition of the invention may be made in situ in the cooling system by adding each component as salts or concentrated solutions and dissolving and mixing these in the cooling system with an aqueous medium. Alternately, the components may be mixed and dissolved in a separate container in an aqueous medium and then adding the solution to the cooling system. The aqueous medium is preferably predominantly water. If used at sub-freezing temperatures, an aliphatic alcohol, such as for example methanol, ethanol, or preferably ethylene glycol, may also be added to depress the freezing point. Commercially available antifreezes may not be suitable, since the corrosion inhibitors and buffers in these compositions may react with the constituents of the cleaning composition of the invention and nullify its cleaning effect.

The composition of the invention can be used by first completely flushing the cooling system to be cleaned with water to remove all antifreeze coolant and the like. As discussed above, commercial antifreezes often contain substances that are incompatible with the cleaner composition of the invention. Therefore, it is preferred that essentially all of any antifreeze composition (at least 85%) be removed from the cooling system before adding the cleaner composition of the invention. The composition of the invention is then placed in the cooling system by any suitable means, such as by preparing the composition of the invention in a separate container and then pouring it into the cooling system, or by adding the EDTA, citrate, and nitrate salts, water, and other desired additives, to the cooling system and circulating the water in the system to dissolve and mix the constituents.

Preferably the composition of the invention is prepared by first providing a "concentrate" containing all of the necessary and optional constituents of the composition of the invention in aqueous solution, and then diluting this concentrate in the cooling system with an aqueous medium, preferably water. The concentration of the components in the concentrate and the dilution ratio are adjusted to provide the final desired concentrations. The concentrate may also comprise a slurry of undissolved salt crystals, which, upon dilution of the concentrate, dissolve and provide the desired final concentration. This slurry concentrate may be necessary if high concentrations of the components are desired.

The concentration of the EDTA, citrate and nitrate salts in the concentrate are typically between about 3 and about 15, preferably between about 6 and about 8, weight percent of tetrasodium ethylenediaminetetraacetic acid, between about 5 and about 35, preferably between about 20 and 25, weight percent trisodium citrate dihydrate, and between about 2 and about 20, preferably between about 3 and 5, weight percent sodium nitrate. The concentrations are for a concentrate that is diluted at a ratio of between about 0:1 to about 10:1, preferably about 5:1 to about 10:1 volumes water to volumes concentrate. When diluted at a dilution ratio of about 10 volumes water to 1 volume concentrate, the resulting cleaning composition of the the invention has a concentration of between about 0.3 and about 4, preferably between about 0.7 and 3 weight percent of the tetrasodium salt of ethylenediaminetetraacetic acid, of between about 0.6 and about 8, preferably between about 2 and 6, weight percent trisodium citrate dihydrate, and of between about 0.2 and about 5, preferably between about 0.3 and 1, weight percent sodium nitrate.

The pH of the concentrate is preferably between about 10 and about 14, more preferably between about 12 and about 13. With the above dilution ratios and concentrations, this provides the above discussed preferred pH in the final composition of the invention in the cooling system.

The concentrate also preferably contains an aluminum corrosion inhibitor, preferably sodium silicate. Suitable amounts in the concentrate are between about 0.1 and about 5 weight percent, preferably about between about 0.5 and 2 weight percent sodium silicate (as a 40 wt.% solution of 3.22 parts $SiO_2$ to 1.0 part $Na_2O$ by weight). When diluted at a ratio of 10 volumes water to 1 volume concentrate, this provides a concentration of between about 0.01 and about 0.6, preferably between about 0.06 and about 0.2, weight percent.

The concentrate can be made by any suitable method, wherein the salts are dissolved in an aqueous medium. Preferably the citrate is formed in situ by adding aqueous citric acid solution and a neutralizing agent in aqueous solution, such as an alkali-metal hydroxide, preferably sodium hydroxide. This preferred method for making the concentrate is illustrated by Example I.

The preferable method for using the composition of the invention is by adding the above-discussed concentrate to the cooling system, as described above, and then diluting the concentrate with water at the above discussed dilution ratio of from 0:1 to about 10:1, preferably about 5:1 to about 10:1, volumes water to volumes concentrate. The water to dilute the concentrate may also contain a freezing-point depressing alcohol, such as those listed above.

After addition of the cleaning composition to the cooling system, the cooling system is then operated normally, either continuously or intermittently, for a sufficient time to remove the solder bloom from the high lead solder surfaces of the cooling system. When the preferred composition of the invention is used, scale will also be removed. Much of the cleaning effect is accomplished after about 3 hours, although longer treatment times may be desirable to remove all observable solder bloom and scale. Typical treatment times are between about 3 and about 10 hours, preferably between about 3 and about 6 hours. These times are for automobile cooling systems running normally during warm weather wherein the thermostat valve usually remains open. In these conditions, the operating temperature for cooling systems at an operating pressure of about 15 psig (103 kilo Pascals gauge) is typically between about 190° F. (88° C.) and about 250° F. (121° C.). At lower temperatures, longer treatment times are necessary.

After treatment with the cleaning composition the cooling system is flushed, preferably with water, to remove at least about 85 percent of of the cleaning composition. This is necessary because the cleaning composition may interfere with additives of a subsequently added antifreeze composition. After flushing, the cooling system is filled with water and a suitable antifreeze composition.

The concentrates and cleaner compositions of the invention may also contain other optional ingredients that do not interfere with the function of the other constituents. For example, they may contain a dye to help insure that all of the cleaning composition is flushed from the cooling system. Suitable dyes include any water soluble dye at a concentration that is visible until at least 85% of the cleaner is flushed out. A suitable dye is Uranine concentrate at a concentration of about 0.004 wt.%.

The invention will now be illustrated by the following examples. Although the preferred embodiments of the invention are described herein in detail, it is understood that the following examples are not limitative of the invention and modifications may be made within the spirit of the invention.

In the examples below the following materials were used;

Tetrasodium salt of ethylenediaminetetraacetic acid. (Tetra-Na EDTA), available from Ciba-Geigy, Ardsley, N.Y., or W. R. Grace & Co., New York, N.Y.;

Citric acid solution (50 wt.%) available from Pfizer Inc., New York, N.Y., or Miles Laboratories, Inc., Elkart, Ind.;

Trisodium citrate dihydrate, available from Pfizer Inc., New York, N.Y., or Miles Laboratories, Inc., Elkart, Ind.; and Sodium silicate (Grade 40—a 40 wt.% solution of a mixture of 3.22 parts $SiO_2$ to 1.0 part $Na_2O$ by weight) available from Diamond-Shamrock, Dallas, Tex.

EXAMPLE I

This example demonstrates a preferred method for preparing a concentrate of a cleaning composition of the invention, and describes a preferred composition of the concentrate. This concentrate is preferably used by first flushing the internal combustion engine cooling system to be cleaned with water to remove essentially all antifreeze coolant (at least about 85%) and adding the concentrate to the cooling system. Water is then added to a dilution ratio between about 0:1 and 10:1, preferably between 5:1 and 10:1. The automobile engine is then operated normally for a period between about 3 and about 10 hours, preferably between about 3 and 6 hours, after which the cooling system is thoroughly flushed with water to remove essentially all cleaning solution, (at least about 85%) and a suitable coolant is added to the coolant system.

The concentrate of a cleaning composition of the invention is made by adding 1118 gallons (4231 liters) of tap water to a mixing tank with a propeller-type or turbine mixer, a cooling jacket or internal cooling coils, and a recirculating line with a pump and a sight glass.

To the above water, 4165 kilograms of a 50 wt.% citric acid ($H_3C_6H_5O_7$) solution is added and the mixer and cooling jacket were started. To this mixture 2.6 kilograms of a 0.5 wt.% phenolphthalein solution is added and the pump for the recirculating line is started. Sodium hydroxide solution (50 wt.% NaOH) is slowly added to the vortex until the solution, as observed through the sight glass just turns pink from the phenolphthalein indicator. The temperature is controlled at about 180° F. (83° C.) or below by the use of the cooling jacket or internal cooling coils. About 2655 kilograms of neutralizing sodium hydroxide solution (50 wt.%) is added. After addition of the sodium hydroxide, the solution is cooled to below about 130° F. (54° C.). Ten (10.0) milliliters of the solution are removed and titrated with 0.1N HCl to a pH of 8.1. If more than 45 milliliters of HCl are required then citric acid solution is added until less than 45 milliliters titre are required. Next, 446 kilograms of sodium nitrate pellets and then 924 kilograms of solid tetrasodium EDTA (as $Na_4C_{10}H_{12}N_2O_8$) are dissolved in the solution. Excess sodium hydroxide solution (50 wt.% NaOH) is then added to give a suitable alkalinity to the final concentrate product. The amount of sodium hydroxide is preferably determined from the amount of HCl required in the above tritration according to the equation below;

wt.% NaOH = 45 − (1/ml HCl), where wt.% NaOH is the weight percent of excess NaOH solution in the final composition. A dye is then added by predissolving a suitable dye, preferably about 0.5 kilograms of Uranine concentrate, in 5 gallons of water and adding to the solution. An aluminum corrosion inhibitor is then added (about 191 kilograms of Grade 40—40 wt.% sodium silicate). The pH of the resulting concentrate should be about 12 when one volume thereof is diluted with nine volumes of water. The composition of a preferred concentrate, expressed in terms of the added constituents in weight percent, is shown below in Table A;

TABLE A

| Composition of the Invention | |
|---|---|
| Additive | (wt. %) |
| Citric Acid | 32.70 |
| Water | 33.176 |
| Indicator | 0.02 |
| Neut. NaOH | 20.85 |
| Excess NaOH | 1.00 |
| Sodium Nitrate | 3.50 |
| Tetra-Na—EDTA | 7.25 |
| Dye | 0.004 |
| Sodium Silicate (Grade 40) | 1.50 |
| TOTAL | 100.00 |

EXAMPLE II

Compositions of the invention (D-Inv., E-Inv.) and comparative prior art compositions (A-Comp., B-Comp., C-Comp.) were made and tested. The compositions (1000 grams of each composition) were prepared by first making concentrates. The concentrates were prepared by dissolving tetrasodium EDTA (as $Na_4C_{10}H_{12}N_2O_8$), trisodium citrate dihydrate (as $Na_3C_6H_5O_7.2H_2O$), and sodium nitrate in water in amounts to give the compositions shown in Table B. The pH of the concentrate was adjusted with about 1 wt.% of sodium hydroxide solution (50 wt.% NaOH) to between about 11.5 and about 12.0.

TABLE B

| | Concentrates | | | | |
|---|---|---|---|---|---|
| | A-Comp. | B-Comp. | C-Comp. | D-Inv. | E-Inv. |
| EDTA | 5% | 10% | None | 5% | 5% |
| Na—Citrate | 5% | None | 10% | 5% | 25% |
| Na—Nitrate | None | 5% | 5% | 5% | 5% |

The concentrates were diluted at a ratio of one volume concentrate to 9 volumes water and the resulting compositions were tested using the standardized test procedures of ASTM D 1384-70, with the metal specimens immersed in the cleaning solution at about 190° F. (88° C.) for 6 hours, and instead of an antifreeze solution with the corrosive water, the above test compositions were used. In this test the metal samples are subjected to heated solution at thermostat-opening temperature. This test is designed to simulate approximately the conditions of use of the composition of the invention in a cooling system. The metal specimens for each test were pieces cut from an automobile radiator, each comprising four tubes with heavy solder bloom and rust-colored scale deposits. After each test, the samples were examined visually and the percent of deposits removed, as determined by the absence of solder bloom and the amount of metal surface exposed, was noted. The results are summarized in Table C.

TABLE C

| | Corrosion Product Removal | | | | |
|---|---|---|---|---|---|
| | A-Comp. | B-Comp. | C-Comp. | D-Inv. | E-Inv. |
| Solder Bloom | 50% | 70% | 0 | 95% | 95% |
| Rust Scale | 40% | 0 | 50% | 80% | 90% |

A removal value for solder bloom greater than 85% is considered effective. At removal values above 85%, only traces of solder bloom deposits remain, with the soldered tube ends being essentially open and unrestricted by solder bloom deposits. Below 85% there are still solder bloom deposits restricting the tube openings at the tube ends. At 70%, the highest removal value of the prior art compositions, there was still significant restriction of the tube openings by thick deposits of solder bloom at the tube ends.

As seen by the above results, the prior art comparative examples were ineffective or at best only partially effective in removing solder bloom. However, the compositions of the invention were effective and removed nearly all of the solder bloom.

For the removal of scale, a removal value of about 50% or below is considered unacceptable. At 50% scale removal, there are still significant deposits of scale on the metal surfaces and restriction by scale of the tube passages As can be seen by the above results, the prior art compositions were ineffective or, at best, only partially effective in removing scale, whereas the compositions of the invention were both effective in removing scale, showing high removal values of 80% and 90%. These removal values are better than the removal values of the comparative compositions (40%, 0%, 50%) by at least about a factor of two. For composition of the invention E-Inv., more sodium citrate was added to provide a composition that was even more effective in removing scale. By comparison of E-Inv. with composition of the invention D-Inv., it is shown that a higher concentration of the citrate salt provides a composition that is more effective in removing scale.

EXAMPLE III

Comparative tests were run to determine the effective level of EDTA to remove solder bloom. A base solution was made by dissolving 225 grams technical grade trisodium citrate dihydrate (Tri-Na-Citrate $2H_2O$) in 665 grams of tap water. Ten (10) grams NaOH in the form of a 50 wt.% solution were added, followed by 80 grams of $NaNO_3$ as a 40 wt.% solution. Forty (40) grams of Grade 40 sodium silicate, were then added to the mixture and dissolved. This base solution was divided into five portions and the tetra-sodium salt of EDTA was dissolved in four of the portions in amounts to give Concentrates A, B, C, and D. The fifth portion, (Concentrate E) was a control. The amounts of the constituents in each concentrate are shown below in Table D;

TABLE D

| | EDTA Comparison | | | | |
|---|---|---|---|---|---|
| | Composition | | | | |
| | A | B | C | D | E |
| | (weight percent) | | | | |
| Tri-Na—Citrate. $2H_2O$ | 25 | 25 | 25 | 25 | 25 |
| 40% Sodium Nitrate | 8 | 8 | 8 | 8 | 8 |
| Tetra-Na—EDTA | 10 | 8 | 6 | 4 | 0 |
| Na—Silicate | 2 | 2 | 2 | 2 | 2 |
| Water | 55 | 57 | 59 | 61 | 65 |
| TOTAL | 100 | 100 | 100 | 100 | 100 |

Each concentrate was diluted at a ratio of one part concentrate to 9 parts water and the resulting compositions were tested as in Example II, except the removal values for solder bloom were noted after 3 hours and 18 hours. Radiator samples with heavy deposits of solder bloom were used as the metal samples. The results are summarized below in Table E;

TABLE E

| | EDTA Comparison - Results | | | | |
|---|---|---|---|---|---|
| | Solder Bloom Removed (%) | | | | |
| Time | A | B | C | D | E |
| 3 hr. | 90–95 | 90–95 | 90–95 | 80–85 | 0 |
| 18 hr. | 100 | 100 | 100 | 100 | 0 |

As shown by the above results, an EDTA concentration greater than 4 weight percent, (as in Compositions A, B, and C), provides an effective removal of solder bloom after only three hours. Composition D at an EDTA concentration of 4 weight percent, although less effective, was marginally effective after only three hours and effectively removed all of the solder bloom after 18 hours. All of these compositions (A, B, C, and D) represent practice of the invention. Compositions A, B and C represent preferred compositions of the invention. Control Composition E, containing no EDTA, showed no or negligible removal of solder bloom after even 18 hours, showing the necessity of using EDTA in the compositions of the invention.

EXAMPLE IV

A concentrate according to the invention was produced as in Example I, and as shown in Table A, except a total batch size of 50 kg was produced, with the amounts of constituents proportionally adjusted. The resulting composition was diluted at a ratio of one part concentrate to 9 parts water, and tested as in Example II. After 4 hours, 95 percent of the solder bloom was removed, and after 8 hours the solder bloom was entirely gone.

EXAMPLE V

Compositions made according to the prior art were made and tested for solder bloom removal. The compositions were made according to the teachings of Levy in U.S. Pat. No. 3,419,501. Levy teaches a composition comprising a water soluble alkali-metal salt of a aminopolycarboxylic acid, alkali metal nitrate or nitrite, and an alkali metal silicate, at a pH between about 6 and 10. The particular compositions according to Levy were made as described in his Example I, in column 4, by forming solutions of aminopolycarboxylic acid salt, $NaNO_3$, and $Na_2SiO_3$. The Levy compositions were A (Levy-A) and C (Levy-C) in his Table I. The aminopolycarboxylic acid salt was a mixture of 89 weight percent tetrasodium EDTA, and 11 weight percent of the monosodium salt of N,N-di-(2-hydroxyethyl)glycine (DHG). These compositions are shown below in Table F;

TABLE F

| | Levy Compositions | |
|---|---|---|
| | Levy-A | Levy-C |
| | (wt. percent) | |
| EDTA | 82.8 | 72.4 |
| DHG | 10.2 | 9.0 |
| $NaNO_3$ | 3.5 | 9.3 |
| $Na_2SiO_3$ | 3.5 | 9.3 |

Three samples of each of the above compositions were dissolved in 1000 milliliters of water and the pH was adjusted to 6, 8 and 10, respectively. The resulting six samples were tested as in Example II, using metal samples with heavy deposits of solder bloom. The percent of solder bloom removed was noted at 4 hours and 8 hours. The results are summarized in Table G.

TABLE G

| | Tests-Levy Compositions | |
|---|---|---|
| | Solder Bloom Removed (%) | |
| Time | 4 hours | 8 hours |
| Levy-A | | |
| pH 6 | 20 | 20–25 |
| pH 8 | 20 | 20–25 |
| pH 10 | 20 | 20–25 |
| Levy-C | | |
| pH 6 | 20 | 20–25 |
| pH 8 | 20 | 20–25 |
| pH 10 | 20 | 20–25 |

As shown by the above results, this prior art composition was ineffective in removing solder bloom, notwithstanding Levy's disclosure that the same composition is effective in removing corrosion, in particular rust. This contrasts with the composition of the invention of Example IV, which removed nearly all of the solder bloom after four hours and all of the solder bloom after eight hours. The Levy composition as well as other prior compositions are known as effective cleaners of rust and the like. However, as discovered by the applicant and shown in the above Examples II and III, the composition of the invention comprising a EDTA salt, a citrate salt, and a nitrate salt effectively removes solder bloom. The prior art does not teach this combination, and prior art compositions are ineffective as solder bloom cleaners.

Although preferred embodiments of this invention have been described in detail, it is contemplated that modifications thereof may be made and some features may be employed without others, all within the spirit and scope of the invention.

What is claimed is:

1. A cooling system cleaning composition comprising an aqueous solution of between about 0.3 and about 15 weight percent of a tetra-alkali metal salt of ethylenediaminetetraacetic acid, between about 0.6 and about 35 weight percent of a water-soluble salt of citric acid and between about 0.2 and about 20 weight percent of a water-soluble salt of nitric acid, said weight percentages based on the sodium salts and said composition being effective for removing solder bloom.

2. The composition of claim 1 wherein the pH is between about 10 and about 14.

3. The composition of claim 1 wherein the pH is between about 11.5 and about 12.5.

4. The composition of claim 2 additionally comprising an aluminum corrosion inhibitor in a corrosion inhibitory amount.

5. The composition of claim 4 wherein the aluminum corrosion inhibitor is an alkali metal silicate.

6. The composition of claim 4 wherein the aluminum corrosion inhibitor is sodium silicate.

7. The composition of claim 1 wherein the amount of the soluble salt of citric acid is sufficient to provide a composition for effective removal of scale.

8. The composition of claim 1 wherein the tetraalkali metal salt of ethylenediaminetetraacetic acid is the tetrasodium salt of ethylenediaminetetraacetic acid, the soluble salt of citric acid is trisodium citrate dihydrate, and the soluble salt of nitric acid is sodium nitrate.

9. The composition of claim 8 additionally containing an aluminum corrosion inhibitor in a corrosion inhibitory amount.

10. The composition of claim 8 additionally comprising an alkali metal silicate aluminum corrosion inhibitor in a corrosion inhibitory amount, and wherein the pH is between about 10 and about 14.

11. The composition of claim 10 wherein the aluminum corrosion inhibitor is sodium silicate.

12. The composition of claim 10 wherein the pH is between about 11.5 and 12.5.

13. The composition of claim 8 additionally comprising between about 0.01 and 5.0 weight percent sodium silicate (as 40 wt.% solution of a mixture of 3.22 parts $SiO_2$ to 1.0 part $Na_2O$ by weight), based on the total weight of the composition, and wherein the pH is between about 10 and about 14.

14. The composition of claim 8 comprising between about 0.3 and about 4 weight percent of tetrasodium ethylenediaminetetraacetic acid, of between about 0.6 and about 8 weight percent trisodium citrate dihydrate, and of between about 0.2 and about 5 weight percent sodium nitrate, based on the total weight of the composition.

15. The composition of claim 14 additionally comprising between about 0.01 and 0.6 weight percent sodium silicate (as 40 wt.% solution of a mixture of 3.22 parts $SiO_2$ to 1.0 part $Na_2O$ by weight), based on the total weight of the composition, and wherein the pH is between about 10 and about 14.

16. The composition of claim 8 comprising between about 0.7 and about 3 weight percent of tetrasodium ethylenediaminetetraacetic acid, of between about 2 and about 6 weight percent trisodium citrate dihydrate, and of between about 0.3 and about 1 weight percent sodium nitrate, based on the total weight of the composition.

17. The composition of claim 16 additionally comprising between about 0.01 and 0.2 weight percent sodium silicate (as 40 wt.% solution of a mixture of 3.22 parts $SiO_2$ to 1.0 part $Na_2O$ by weight), and wherein the pH is between about 11.5 and about 12.5.

18. A cooling system cleaning concentrate comprising an aqueous solution of between 3 and about 15 weight percent of tetrasodium ethylenediaminetetraacetic acid, of between about 5 and about 35 weight percent trisodium citrate dihydrate, and of between about 2 and about 20 weight percent sodium nitrate, based on the total weight of the composition, said concentrate being effective for removing solder bloom when diluted with water at a ratio between about 0:1 and about 10:1 volumes water to volumes concentrate.

19. The concentrate of claim 18 additionally comprising between about 0.1 and 5 weight percent sodium silicate (as 40 wt.% solution of a mixture of 3.22 parts $SiO_2$ to 1.0 part $Na_2O$ by weight), based on the total weight of the composition, and wherein the pH is between about 10 and about 14.

20. The concentrate of claim 18 comprising between about 6 and about 8 weight percent of tetrasodium ethylenediaminetetraacetic acid, of between about 20 and about 25 weight percent trisodium citrate dihydrate, and of between about 3 and about 5 weight percent sodium nitrate, based on the total weight of the composition.

21. The composition of claim 20 additionally comprising between about 0.5 and 2 weight percent sodium silicate (as 40 wt.% solution of a mixture of 3.22 parts $SiO_2$ to 1.0 part $Na_2O$ by weight), based on the total weight of the composition, and wherein the pH is between about 12 and about 13.

22. A method for cleaning solder bloom from a cooling system which comprises (a) removing any antifreeze coolant from the cooling system; (b) adding to the cooling system an aqueous solution of a tetra-alkali-metal salt of ethylenediaminetetraacetic acid, of a soluble salt of citric acid, and of a soluble salt of nitric acid; (c) circulating the aqueous solution through the cooling system to remove the solder bloom from the metal surfaces of the cooling system; and (d) removing from the cooling system the aqueous solution and the solder bloom removed from the metal surfaces.

23. The method of claim 1 wherein the dilution ratio is between about 5:1 and about 10:1 volumes water to volumes aqueous solution.

24. The method claim 22 wherein the aqueous solution is circulated through the cooling system for a period of between about 3 and about 10 hours.

25. The method claim 22 wherein the aqueous solution is circulated through the cooling system for a period of between about 3 and about 6 hours.

26. The method of claim 22 wherein the aqueous solution comprises between about 3 and about 15 weight percent of the tetrasodium salt of ethylenediaminetetraacetic acid, of between about 5 and about 35 weight percent trisodium citrate dihydrate, and of between about 2 and about 20 weight percent sodium nitrate, based on the total weight of the composition.

27. The method of claim 26 wherein the aqueous solution additionally comprises between about 0.1 and 5 weight percent sodium silicate (as 40 st.% solution of a mixture of 3.22 parts SiO$_2$ to 1.0 part Na$_2$O by weight), based on the total weight of the composition, and wherein the pH is between about 10 and 14.

28. The method of claim 22 wherein the aqueous solution comprises between about 6 and about 8 weight percent of the tetrasodium salt of ethylenediaminetetraacetic acid, of between about 20 and about 25 weight percent trisodium citrate dihydrate, and of between about 3 and about 5 weight percent sodium nitrate, based on the total weight of the composition.

29. The method of claim 28 wherein the aqueous solution additionally comprises between about 0.5 and 2 weight percent sodium silicate (as 40 st.% solution of a mixture of 3.22 parts SiO$_2$ to 1.0 part Na$_2$O by weight), based on the total weight of the composition, and wherein the pH is between about 12 and 13.

30. The method of claim 22 wherein water in addition to the water in the aqueous solution is added to the cooling system.

31. The method of claim 30 wherein water is added to the cooling system at a dilution ratio greater than 0:1 and less than or equal to 10:1 volumes water to volumes aqueous solution.

32. The method of claim 22 wherein no water in addition to the water in the aqueous solution is added to the cooling system.

* * * * *